United States Patent

[11] 3,544,745

[72] Inventor Wainwright Tuttle
 Cincinnati, Ohio
[21] Appl. No. 753,944
[22] Filed Aug. 20, 1968
[45] Patented Dec. 1, 1970
[73] Assignee Spati Industries Inc.
 Covington, Kentucky
 a corporation of Kentucky

[54] SENSOR
 6 Claims, 3 Drawing Figs.
[52] U.S. Cl. .................................................. 200/83
[51] Int. Cl. .................................................. H01h 35/40
[50] Field of Search .................................... 200/83(.8)

[56] References Cited
 UNITED STATES PATENTS
1,132,400  3/1915  Simpson ................ 200/83(.8)
1,464,307  8/1923  Bowlus .................. 200/83(.8)
1,665,381  4/1928  Siddall et al. .......... 200/83(.8)
2,477,801  8/1949  Hathaway .............. 200/83(.8)
2,768,261  10/1956 Mathisen ............... 200/83(.8)
3,233,059  2/1966  Pridham Jr. et al. .... 200/83(.8)
3,256,399  6/1966  Palmer .................. 200/83(.8)
3,268,683  8/1966  Palmer .................. 200/83(.8)

Primary Examiner—Robert K. Schaefer
Assistant Examiner—J. R. Scott
Attorney—Melville, Strasser, Foster & Hoffman ABSTRACT: Device for sensing very small changes in fluid pressure or quantity including a pair of electrical contacts, one of the contacts being adjustably fixed and the other of the contacts being carried by a very thin, light weight, resilient member separating a fluid at a fixed pressure or quantity from the fluid where change is to be detected.

PATENTED DEC 1 1970
3,544,745
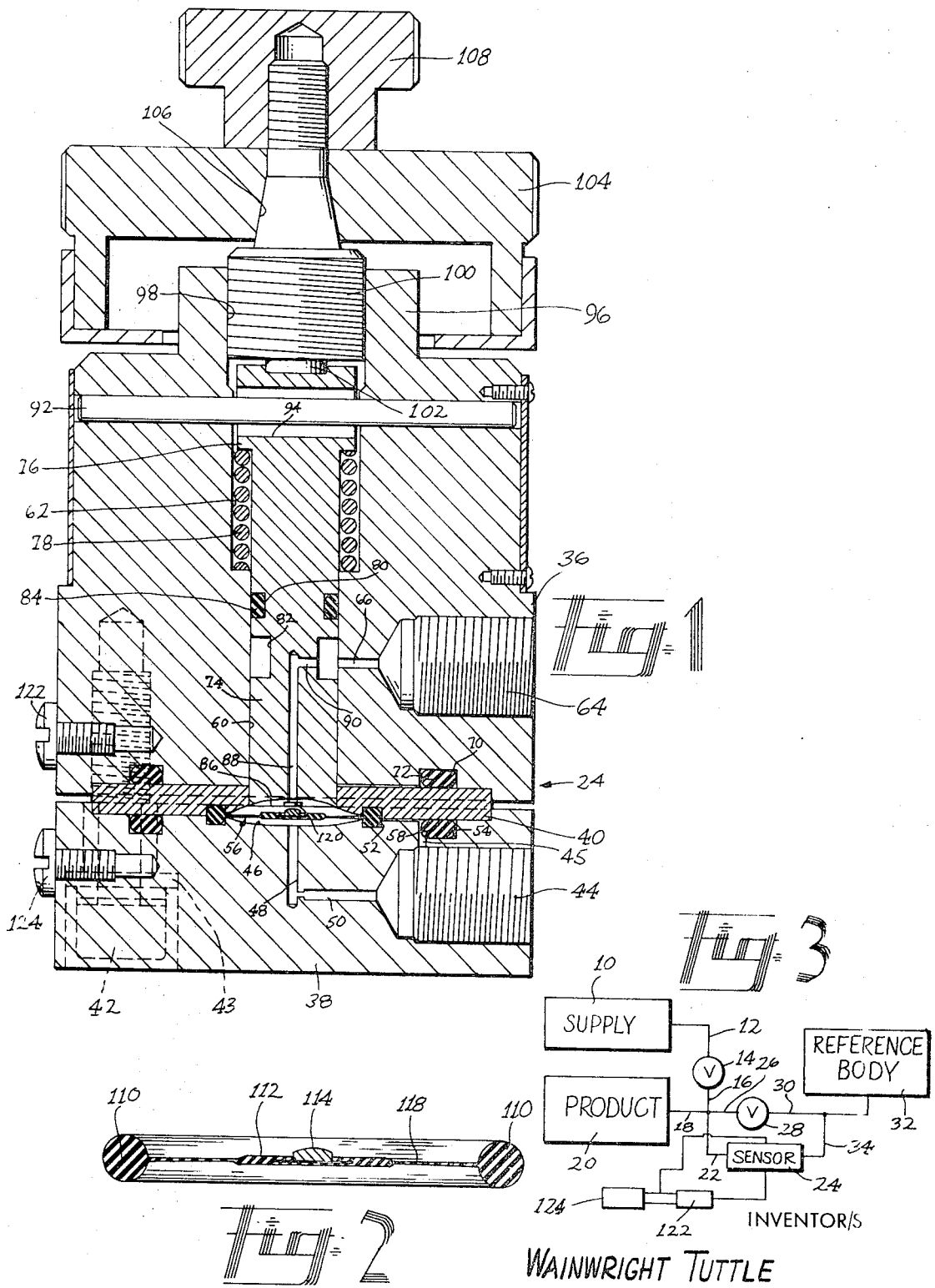
INVENTOR/S
WAINWRIGHT TUTTLE
BY Melville, Strasser, Foster and Hoffman
ATTORNEYS

SENSOR

BACKGROUND OF THE INVENTION

The sensor of this invention is particularly adapted to detect a very minute change in fluid pressure or quantity in order to detect and/or measure the magnitude of a leak or flow of a product.

At present, testing of this type is carried out by several methods, including filling the product with liquid under pressure and visibly searching for a liquid leak; filling the product with gas under pressure and detecting a leak by the presence of bubbles in a foaming liquid applied to the outer surface of the product; filling the product with a special gas which lends itself to sensitive detection by chemical or electronic means; and detection of the sonic or ultrasonic sound of gas escaping.

The most widely used methods depend upon visual detection of, for example bubbles in a foam forming liquid brushed on the surface or in a tank of liquid from a product pressurized with air, or the detection of the liquid appearing on the outside of a product pressurized with a liquid. Generally, the other methods described require much more costly equipment and are more limited in application.

Some efforts have been made to provide a test method which would be as widely applicable as the common visual detection methods but would not depend on visual inspection and close human attention and judgment.

These efforts include charging large numbers of the product with fluid, storing them for a prolonged period and then determining any pressure or weight loss. This method is effective but is costly in time, space and labor. Further, it cannot distinguish between leak and expansion.

Another effort is the detection of a pressure drop due to leakage or expansion which is so small that it can be detected in a very short period of time. This method has the potentiality of a rapid, accurate test with a moderate cost of equipment and the elimination of the factors of careful human observation and judgment. However, efforts to produce a sufficiently sensitive and reliable sensor for detecting these minute changes have resulted in only partial success, the instrumentation being either unstable and unreliable, or delicate and costly.

One type of sensor consists of a liquid manometer with a photocell to detect rise of the partially opaque liquid in the tube. This merely detects pressure change and also has the disadvantages of inability to resist overpressures, and the effect of gradual contamination of the liquid.

Most existing pressure sensors of a very sensitive nature generally depend on the displacement of an element of very large area to multiply the force available. In the detection of a loss of gas from a product under test, the use of a large area which requires a large displacement volume obviously defeats the purpose and is relatively insensitive.

Another type of system employs a pneumatic amplifier which produces a large signal form the signal of the primary sensor which is of the above large area differential pressure sensor type. The effort is to reduce the necessary movement to keep the displacement small.

SUMMARY OF THE INVENTION

The sensor of this invention includes a housing communicating on one side with the product to be tested, and on the other side with a known fluid or gas system. Mounted in the housing, and serving to separate the product being tested from the known system is a very thin, light weight resilient member of relatively small effective area.

The resilient member is of small diameter so that a very small change of quantity of fluid causes a relatively large movement. The resilient member should be very thin and very flexible so that only a very small pressure difference overcomes the weight and residual stiffness, and permits the initiation of movement thereafter produced mainly by a change of quantity of fluid.

An electrical system is provided including a pair of contacts, one of which is adjustably carried by the housing, while the other contact is carried by the resilient member. The electrical circuit is arranged to be energized upon movement of the resilient member.

It is therefore a principal object of the invention to provide a sensing device which will detect a minute change in quantity of gas in an enclosure with almost no change in pressure.

Another object of the invention is to provide a sensing device which is required to perform almost no work and exert almost no force to produce a signal when the quantity of gas in an enclosure to which it is connected changes by a very minute amount. Another object of the invention is to provide a sensing device which can withstand large balanced or differential pressures without changing its characteristics appreciably.

A further object of the invention is to provide a sensor which will respond to a very small initial pressure change and have a very small displacement volume to produce the signal.

It is another object of the invention to provide a sensor, the sensitivity of which is independent of the volume of the product being tested. That is, a sensor which responds almost entirely to volume changes will have a sensitivity unaffected by the volume of the product being tested.

DESCRIPTION OF THE DRAWING

FIG. 1 is a cross-sectional view through a sensor according to this invention.

FIG. 2 is a cross-sectional view on a greatly enlarged scale through the diaphragm of this invention.

FIG. 3 is a schematic view illustrating the use of the sensor of this invention in connection with a gas testing system.

DESCRIPTION OF THE PREFERRED EMBODIMENT

As already indicated, FIG. 3 is a schematic showing of a leak testing system including the sensor of this invention, and it is believed that a brief description of this system will facilitate an understanding of the instant invention. The system includes a supply of fluid under pressure indicated at 10 which communicates via the conduit 12 with the isolation valve 14. When the valve 14 is opened, fluid under pressure can pass via the conduits 16 and 18 to a product or vessel 20 being tested. At the same time, fluid under pressure can pass via the conduits 16 and 22 to the sensor indicated generally at 24, and via the conduits 16 and 26, through the bypass valve 28 and conduit 30 to the reference vessel 32, and via the conduits 16 and 26, through the bypass valve 28, and conduits 30 and 34 with the other side of the sensor 24.

In operation, both the valves 14 and 28 are opened, so that the entire system is charged with fluid at a predetermined test pressure. The isolation valve 14 is then closed, and after a brief time delay to allow for stabilization, the bypass valve 28 is closed. At this point, it will be observed that the sensor 24 communicates on one side with a closed system including the conduits 30 and 34 and the reference vessel 32, and on the other side with another closed system including the conduits 16, 18, 22, and 26 and the vessel being tested 20.

The sensor 24 of this invention is designed to detect and respond to a change of quantity of fluid in the closed system including the product being tested. That is, a leak in the product being tested will manifest itself by a very small change in pressure and quantity of fluid, and the sensor of this invention is designed to detect this leak by comparing the pressures and quantities of fluid in the two closed fluid systems.

Turning now to FIG. 1, the sensor indicated generally at 24 is shown in cross section. It includes a housing having an upper portion 36 and a lower portion 38, separated by the insulating ring 40. The upper and lower portions of the housing may be secured together with the insulating ring 40 therebetween as by the screws 42 which pass with clearance through portion 38 and bear on insulating washers 43.

The lower portion of the housing 38 is provided with an inlet port 44 which will be connected in a conventional manner to the conduit 34. The lower portion of the housing 38 itself is provided with a dished out central portion 46 which communicates via the passages 48 and 50 with the inlet port 44. The portion 38 of the housing is also provided with the annular grooves 52 and 54, which respectively receive the resilient member indicated generally at 56 (described in more detail hereinafter) and the sealing O-ring 58. The passage 45 provides communication between the inlet port 44 and the space between the resilient member and the sealing O-ring to provide a pressure balance on the periphery of the resilient member.

The upper portion of the housing 36 is provided with the central passage 60—62, the inlet port 64 which is connected in a conventional manner to the conduit 22, and with the passage 66 which extends between the inlet port 64 and the central passage 60.

The lower face of the portion 36 of the housing is provided with the recess 68 which receives the insulating ring 40, and with the annular groove 70 which receives the sealing O-ring 72.

Slidably received within the upper portion 36 of the housing is the stem 74 which includes at its upper end a portion of increased diameter 76. Spring 78 is received in the central passage 62 of housing 36 and bears against the portion 76 of the stem, tending to bias the stem upwardly.

The stem 78 is provided with the annular recesses 80 and 82. The recess 80 receives the O-ring 84 which provides a sealing engagement between the stem 74 and the central passage 60, while the recess 83 is of a size to be alined with the passage 66 in the housing.

The lower face of the stem is provided with a slot 86 which communicates via the passages 88 and 90 with the recess 82, and which receives the contact 120.

Preferably, the range of travel of the stem in the housing portion 36 will be limited by the stop pin 92 which passes through the housing 36 and through an opening 94 in the portion 76 of the stem.

The upper surface of the housing portion 36 includes the central boss 96 having the threaded aperture 98 which receives the adjusting screw 100. In the embodiment shown a thrust disc 102 is provided between the lower surface of the adjusting screw 100 and the top surface of the stem 76. It will be apparent that rotation of the adjusting screw 100 will serve to vary the position of the stem 74—76 within the central passage 60—62 of the upper portion of the housing.

Rotation of the adjusting screw 100 may be accomplished by means of the knob 104 which may be releasably locked to the adjusting screw 100 by the mating tapers 106. The locking knob 108 in the position shown locks the knob 104 to the adjusting screw 100, but may be loosened to permit "zeroing" of the device.

The resilient member indicated generally at 56 in FIG. 1 is shown in cross section on a larger scale in FIG. 2. This resilient member is a diaphragm molded of a suitable elastomer of very low elastic modulus and is made electrically conductive by including for example graphite in the molding mixture. In cross section, the resilient member includes an outer, annular O-ring portion 110 and a slightly thickened central portion 112 which carries a contact element 114 preferably the contact 114 will be formed of a gold alloy or the like in order to provide reliable contact with the least possible pressure. In this embodiment shown, the contact 114 is soldered to the reinforcing disc 116 which is in turn molded into the central portion 112 of the resilient element. Extending between the O-ring portion 110 and central portion 112 of the resilient member is the web portion 118 which is made as thin as possible. Excellent results have been obtained with a web portion having a thickness tapering from approximately 0.003 inches at the outer edge to approximately 0.002 inches adjacent the central portion.

As indicated earlier, the lower portion 38 of the housing is provided with an annular groove 52. The diameter of the groove 52 will be slightly greater than the normal relaxed diameter of the O-ring portion 110 of the resilient member, so that when the resilient member is held in the groove, it is slightly stretched across its surface to avoid any possibility of an oilcan effect or snap action.

The slot 86 on the lower end of the stem 74 carries a second electrical contact indicated at 120. It will be apparent from the foregoing discussion that the relative spacing between the contacts 114 and 120 can be varied by the adjusting screw 100 and knob 104 previously described.

The upper and lower portions of the housing 36 and 38 respectively are provided with the terminals 122 and 124 respectively which permit utilization of this sensor in any conventional circuit including means 122 for amplifying the electrical signal and means 124 for producing a visual and/or audible signal as desired. Preferably current in the circuit should be limited to a few microamps to prevent contact welding and contact deterioration. Voltage should be kept relatively high for reliable contact even in the presence of possible polymerization products of gases on the contact surfaces.

Empirical investigations seem to indicate that contact is facilitated by electrostatic attraction. That is, contact occurs when the contacts 114 and 120 are perhaps 0.0005 inches apart, the electrostatic attraction will effect the contact. Thus, with contact force provided by the electrostatic attraction, sensitivity is independent of the normally varying contact force required to make a circuit due to absorbed films and the like.

In operation of the sensor just described, it may be connected to the fluid testing system described briefly earlier, so that initially, equal fluid pressures are present on opposite sides of the resilient member 56. The thicker center portion of the resilient member containing the contact 114 and reinforcing disc 116 has a small but finite weight, so that with the resilient member in a horizontal position, the center of the resilient member will hang a few thousandths of an inch below center in the free position with equal pressures on each side.

When a very small pressure difference develops, enough to carry the weight of the center portion of the diaphragm, it will move upward by the entrance of a very slight amount of additional fluid on the lower side and the exit of a very slight amount of fluid on the upper side without any appreciable increase in differential pressure.

This action can best be explained by comparing it to the action of a theoretical frictionless piston in a vertical cylinder. Once the pressure difference between the top and bottom of the piston is enough to support the weight of the piston, it will move upward from a flow of fluid out of the space above it and into the space below it without any appreciable increase in the pressure difference.

In the case of the instant invention, this action takes place over a very small movement of the resilient member, but this is sufficient to make the electrical contact desired, so that the sensor responds primarily to a change of quantity of fluid, once the very small pressure difference is established.

The sensor of the instant invention is also advantageously employed in other methods of testing, such as gain testing, whereby a product is charged with gas and enclosed in a chamber, any leakage causing a gain in the quantity of gas in the enclosure which can be readily sensed, the reference in this case being atmospheric pressure.

It is believed that the foregoing constitutes a full and complete disclosure of this invention, and no limitations are to be inferred or implied from the foregoing specific description, except insofar as set forth in the claims which follow.

I claim:

1. In a system for detecting very small changes in fluid pressure or quantity by comparing a first fluid system containing fluid at a fixed pressure and quantity with a second fluid system wherein a change is to be detected, a sensor comprising:

a. a rigid housing having a cavity communicating with both said first and second fluid systems;
b. electrically conductive flexible diaphragm means mounted in said cavity and separating said first and said second fluid systems;
c. an electrical contact adjustably carried by said housing and extending into said cavity; and
d. electrical circuit means including said flexible means and said electrical contact and arranged to be energized upon movement of said flexible means.

2. The sensor claimed in claim 1 wherein said flexible diaphragm means is horizontally disposed.

3. The sensor claimed in claim 1 wherein said flexible diaphragm means is under tension across its surface.

4. The sensor claimed in claim 1 wherein said flexible diaphragm means is circular and including an enlarged, annular portion, said housing including a groove to receive said enlarged portion, the diameter of said groove being larger than the diameter of said enlarged portion whereby said elastomer is stretched when secured in said groove.

5. The sensor claimed in claim 4 including passage means providing communication between said enlarged, annular portion of said flexible diaphragm means and said first fluid system whereby to provide a pressure balance on the periphery of said flexible diaphragm means.

6. The sensor claimed in claim 1 wherein said flexible diaphragm means is circular and including a central portion of increased thickness.